United States Patent [19]

Duffield et al.

[11] Patent Number: 5,047,857
[45] Date of Patent: Sep. 10, 1991

[54] TELEVISION SYSTEM WITH ZOOM CAPABILITY FOR AT LEAST ONE INSET PICTURE

[75] Inventors: David J. Duffield; David L. McNeely, both of Indianapolis, Ind.

[73] Assignee: Thomson Consumer Electronics, Inc., Indianapolis, Ind.

[21] Appl. No.: 340,832

[22] Filed: Apr. 20, 1989

[51] Int. Cl.$^5$ .......................................... H04N 5/262
[52] U.S. Cl. .................................... 358/183; 358/22; 358/180
[58] Field of Search ................. 358/183, 22, 180, 182, 358/903, 181

[56] References Cited

U.S. PATENT DOCUMENTS

| | | | |
|---|---|---|---|
| 4,163,249 | 7/1979 | Michael et al. | 358/21 |
| 4,249,211 | 2/1981 | Baba et al. | 358/183 |
| 4,249,212 | 2/1981 | Ito et al. | 358/183 |
| 4,729,028 | 3/1988 | Micic et al. | 358/183 |
| 4,774,582 | 9/1988 | Hakamada et al. | 358/183 |
| 4,792,856 | 12/1988 | Shiratsuchi | 358/180 |

FOREIGN PATENT DOCUMENTS

| | | |
|---|---|---|
| 0013124 | 7/1980 | European Pat. Off. . |
| 0122094 | 10/1984 | European Pat. Off. . |
| 51172 | 5/1981 | Japan .................................. 358/183 |
| 2047041 | 11/1980 | United Kingdom . |
| 2189106 | 10/1987 | United Kingdom . |
| 2222742 | 3/1990 | United Kingdom . |

OTHER PUBLICATIONS

A Recent Innovation in Digital Special Effects—The CBS "Action Track" System, by J. Moore et al., SMPTE Journal, vol. 87, No. 10, Oct. 1978, pp. 673–676.
Digital Video Effects, by Masao Inaba, et al., NEC Research & Development No. 56, Jan. 1980, pp. 130–134.
User's Manual for the Toshiba 30ID1 Television Receiver, pp. 23–28 (translation attached).
"Service Manual KV-27TX20 RM-754 P-3A Chassis" copyright, SONY, 1988.4, pp. 2–8 and 22–27.

Primary Examiner—Tommy P. Chin
Attorney, Agent, or Firm—Joseph S. Tripoli; Peter M. Emanuel

[57] ABSTRACT

A television system including a memory for storing subsampled fields in different sectors corresponding to respective small pictures of a rectangular multi-picture array, includes apparatus for expanding the subsampled fields, preferably to full-screen size, as they are read-out of the memory. When the stored sub-sampled fields correspond to different fields of the same video signal, the arrangement provides for a re-animated version of multi-picture array in a so-called "instant replay" mode of operation.

25 Claims, 2 Drawing Sheets

TELEVISION SYSTEM WITH ZOOM CAPABILITY FOR AT LEAST ONE INSET PICTURE

FIELD OF THE INVENTION

The present invention generally concerns the field of television systems with "picture-in-picture" and/or "multiple-picture" provisions.

BACKGROUND OF THE INVENTION

A number of commercially available television sets and video cassette recorders have picture-in-picture (also called "pix-in-pix" or simply P-I-P) and multi-picture (also called "multi-pix") provisions.

In one form of the multiple-picture feature, essentially multiple "still" pictures derived from the same video source (e.g., channel) "taken" at successively different times are simultaneously displayed in a rectangular array and thereafter periodically and sequentially up-dated. This provides a type of static stroboscopic display which, may be used to study the progression of an action such as swinging a golf swing.

SUMMARY OF THE INVENTION

With regard to one aspect of the present invention, it has been recognized by the present inventors that it is desirable to sequentially magnify (or "zoom") individual ones of the plurality of the small inset pictures of a multi-picture array to a larger, e.g., full screen, size in order to "re-animate" the action in what may be termed an "instant replay" mode.

Specifically, with regard to the disclosed embodiment, another aspect of the invention concerns the structure for magnifying at least one picture insert, particularly the context of a multi-picture memory arrangement. More specifically, this structure comprises, in cascade, subsampling unit which produces one sample for a given number, N, of input video samples, a memory for storing the subsamples, and an interpolator for producing interpolated samples from the stored subsamples. The memory is operated so that the subsamples are written-in at one rate and read-out at a different rate to affect a picture size change.

To produce the "instant replay" operation referred to above, the memory is loaded in a plurality of memory sectors with respective subsampled fields of a video signal. In sequence, each sector of the memory is read out at a rate slower than the write-in rate and the stored subsamples are interpolated to produce interpolated samples. The read-out subsamples and the interpolated subsamples are combined to produce resultant output video samples which are coupled to a display device. The displayed picture comprises a sequence of enlarged images, each image corresponding to a smaller image associated with a respective section of the memory.

BRIEF DESCRIPTION OF THE INVENTION

The invention will be described with reference to the accompanying drawing in which.

DETAILED DESCRIPTION OF THE INVENTION

Figure 1:
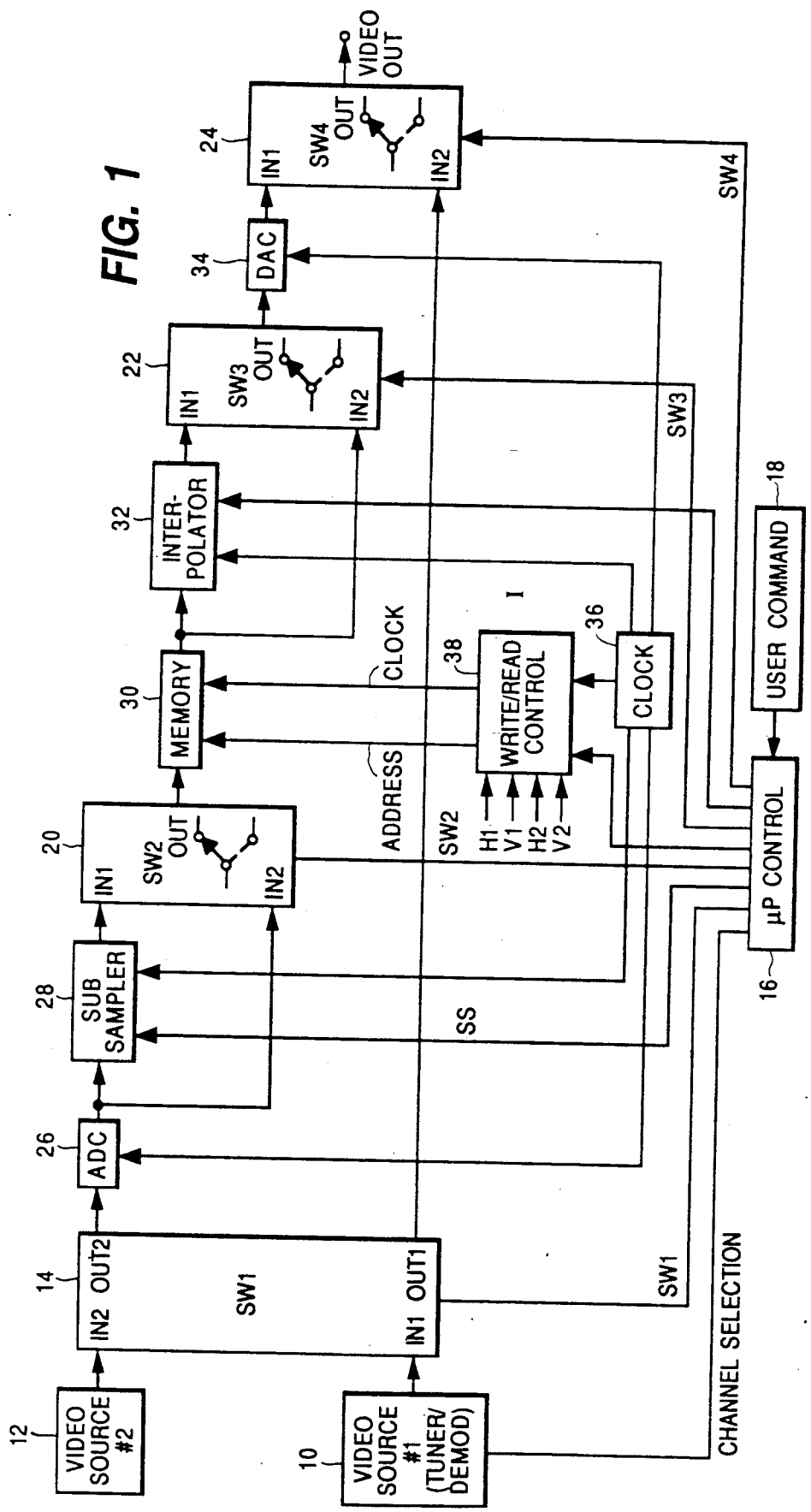
FIG. 1 is a block diagram of a picture-in-picture processor including a preferred embodiment of the present invention.

The picture-in-picture processor shown in FIG. 1 may be incorporated, e.g., in a television system which includes a display device such as a television set or monitor or in a television system which does not include a display device such as a video cassette recorder/player (VCR). In the former case, the output signal of the picture-in-picture system is coupled to the driver for display unit, e.g., a kinescope. In the latter case, the output signal of the system is intended to be coupled to a television system which includes a display device such as a television set, either as a baseband video signal or as a modulated RF carrier, through an output signal connector.

The various operations are performed in component form and one processor like the one shown in FIG. 1 is utilized for each component. The components may be luminance (Y) and two color difference signals (e.g., R-Y and B-Y or I and Q) or three color difference signals. The following description is made with respect to the luminance (Y) component, but applies similarly to the color difference signals; noting however, that lower sampling and clock frequencies are utilized and that less memory capability is required.

The picture-in-picture processor shown in FIG. 1 includes a first video signal source 10, e.g., comprising the tuner/demodulator section of television system in which it is incorporated, and a second video signal source 12, e.g., comprising a baseband video input signal connector.

The baseband video signals produced by sources 10 and 12 are coupled to a first switching unit 14. First switching unit 14 as well as other portions of the picture-in-picture, processor are controlled by a microprocessor (μP) control unit 16. Microprocessor control circuit 16 generates control signals for the picture-in-picture processor in accordance with a stored set of instructions, i.e., a computer program and in response to commands received from a user command entry unit 18, typically including a keyboard (not shown).

The picture-in-picture processor has several operating modes selectable in response to user entered commands. In part, these operating modes are established by the switching states of first switching unit 14, a second switching unit 20, a third switching unit 22, and a fourth switching unit 24.

First switching unit 14 has a first input IN1 and a second input IN2, to which the first and second video input signals are respectively coupled, two outputs OUT1 and OUT2, and, under the control of microprocessor control circuit 16, is capable of providing the following connection configurations.

| OUT 1 | OUT 2 |
| --- | --- |
| IN1 | IN1 |
| IN2 | IN1 |
| IN1 | IN2 |
| IN2 | IN2 |

Output OUT2 of first switching unit 14 is coupled to the cascade arrangement of an analog-to-digital converter (ADC) 26, a subsampling unit 28 and a first input IN1 of second switching unit 20. Second switching unit 20, has a second input IN2, to which the output of ADC 26 is coupled, and an output OUT. Second switching unit 20 has a single pole, double throw operation and accordingly connects either of inputs IN1 and IN2 to output OUT as is indicated by the switching symbol within the block.

Output OUT of second switching unit 20 is coupled to the cascade arrangement of a memory 30, an interpolator unit 32 and a first input IN1 of third switching unit 22. Third switching unit 22 has a second input IN2, to which the output memory 30 is coupled, and, like second switching unit 20, has a single pole, double throw operation.

Output OUT of third switching unit 22 is coupled to the cascade arrangement of a digital to analog converter (DAC) 34 and a first input IN1 of fourth switching unit 24. Fourth switching unit 24 has a second input IN2, to which first output OUT1 of first switching unit 14 is coupled, and also has a single pole, double throw operation. The output signal of the picture-in-picture processor is developed at output OUT of fourth switching unit 24.

A clock generator 36 generates clocking and timing signals for various portions of the picture-in-picture processor.

A write/read control unit 38, under the control of microprocessor control unit 16, generates address signals and write and read clocking signals for memory 30. Write/read control unit 38 receives pairs of horizontal (H) and vertical (V) synchronization signals from both video sources for synchronizing the write and read operations of memory 30 in the various operating modes.

With the arrangement shown in FIG. 1, several primary modes of operation are possible. These are:

1. normal = full screen display from either video source;
2. zoom = magnified display from either video source;
3. picture-in-picture = small picture from either video source inset within full-screen display from other video source;
4. multi-picture = display of plurality of small "still" images in rectangular array (the "still" images are periodically and sequentially updated); and
5. "instant replay" - sequential and repetitive enlargement (e.g., full screen) of small "still" images to form a re-animated form of a corresponding multi-picture array.

These modes of operation correspond to different configurations produced by controlling the various switching units and other components and will be explained in detail below. The following table briefly relates the operating modes with the configurations.

| MODE | ACTIVE UNITS | SWITCH STATUS |
|---|---|---|
| 1. NORMAL | selected video source directly connected to output | SW1 selects source (IN1 or IN2); SW4 selects IN2 |
| 2. ZOOM | ADC26; memory 30; interpolator 32; DAC34 | SW1 selects source; SW2 selects IN2 to by-pass subsampler 28; SW3 selects IN1; SW4 selects IN1 |
| 3. PICTURE-IN-PICTURE | ADC26; subsampler 28; memory 30 (stores every subsampled field in one sector), DAC34 | SW1 selects main and inset (IN1 or IN2); SW2 selects IN1; SW3 selects IN2 to by-pass interpolator 32; SW4 switches between IN1 and IN2 |
| 4. MULTI-PICTURE | ADC26; subsampler 28; memory 30 stores successive subsampled fields in respective sectors; DAC34 | SW1 selects source; SW2 selects IN1; SW3 selects IN2 to by-pass interpolator 32; SW4 selects IN1 |
| 5. INSTANT REPLAY | ADC26; subsampler 28; memory 30 stores successive subsampled fields in successive sectors as in pix-in-pix; interpolator 32; DAC34 | SW1 selects source; SW2 selects IN1 (subsampler 28 not by-passed) SW3 selects IN1 (interpolator 32 not by-passed); SW4 selects IN1 |

Now modes 2, 3, 4 and 5 will be described in detail. The mode 1 (normal) is believed to be sufficiently clear from the above table. It is only noted that since the normal mode only involves the selection of a video source and does not involve any digital operations, the conversions to and from digital form are not necessary.

ZOOM MODE

The purpose of the zoom mode of operation is to magnify or "blow up" the entire image produced from the selected video signal. Of course, because the display device has a fixed display area (i.e., scanning area), those portions of the magnified image falling outside the display area (due to the magnification will not be visible. Thus, only a portion of the image is effectively magnified. In other words, the viewer perceives a "zooming-in" on a portion of the original image.

ADC 26 is used in all the modes except the normal mode.

ADC 26 converts the selected analog video signal coupled to it by first switching unit 14 to digital video samples occuring at the sampling rate determined by clock generator 36. The sampling frequency or rate for the luminance component can be a multiple of the color subcarrier frequency (fsc), for example 3 fsc, or a multiple of the horizontal scanning frequency. The digital video samples produced by ADC 26 are coupled to subsampler unit 28 and to second input IN2 of second switching unit 20.

Subsampler unit 28 is utilized in the picture-in-picture, multi-picture and instant replay modes of operation. However in the zoom mode of operation, second switching unit 20 is caused to connect second input IN2 to output OUT, thereby by-passing subsampler unit 28 and directly coupling the output of ADC 26 to the input of memory 30.

Memory 30 is utilized in all but the normal mode of operation. Memory 30 is capable of storing samples for an entire field of complete (not subsampled) video information, e.g., for luminance, 512 samples (or pixels) per line and 256 lines.

In the zoom mode of operation, as noted above, subsampler unit 28 is by-passed by second switching unit 20, and therefore memory 30 stores an entire field of complete (not subsampled) video information. The 512 samples of each line and 256 lines of each field are sequentially written into memory 30 sample-by-sample, e.g., left to right, and line-by-line, e.g., top to bottom, at the sampling rate ($3f_{sc}$) of ADC 26 and sequentially read out in the same order, but at a slower rate. The relatively slower reading rate causes the samples and lines to be separated further apart in time and therefore to appear correspondingly separated further apart in space in a displayed image. The reading rate is controllable by microprocessor control unit 16 to control the amount of magnification.

In the zoom mode, output of memory 30 is coupled to interpolator unit 32. Interpolator unit 32 is not used in the picture-in-picture and multi-picture modes, it being by-passed by third switching unit 22 in those modes.

Interpolator unit 32 in concert with WRITE/READ memory control unit 38 provides missing interstitial samples and lines.

Interpolator unit 32 sequentially provides the "real" and "interpolated" samples in interleaved form to third switching unit 22 and thereby to DAC 34. The analog signal produced by DAC 34 is coupled through fourth switch 24 to the output of the picture-in-picture processor. DAC 34, like ADC 26 (and memory 30), is used in all but the normal mode, since the picture-in-picture processor operates in digital form in all but the normal mode.

Other possible zoom features are discussed in copending patent application Ser. No. 340,931, entitled "Apparatus And A Method For Automatically Centering A Video Zoom and Pan Display", concurrently filed with this application on Apr. 20, 1989 in the names of B. A. Canfield, D. J. Duffield and D. L. McNeely.

PICTURE-IN-PICTURE MODE

Figure 2A:
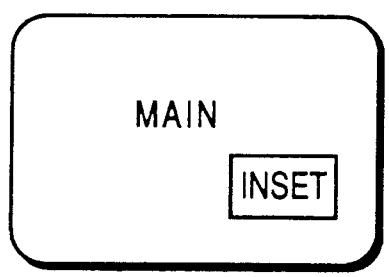
FIGS. 2a and 2b represent displayed images useful in understanding various operating modes of the processor shown in FIG. 1.

The purpose of the picture-in-picture mode is to insert a small or inset picture corresponding to one of the two input video signals within the full screen picture corresponding to other input video signal (see FIG. 2a). Either video signal can be chosen to produce the inset picture and the two can be "swapped" under user control.

In the picture-in-picture mode of operation, subsampler unit 28 is not by-passed by second switching unit 20.

Subsampler unit 28 reduces the number of video samples received by it during each horizontal scan line by a factor N and also reduces the number of scan lines per field by a factor N. Thus, one output sample is produced for every N input samples and one scan line is produced for every N scan lines. The factor N is controlled by microprocessor control unit 16 to determine the size (length and height) of the small picture inset in the picture-in-picture mode (and also determines the size and therefore number of picture insets in the multi-picture mode.)

Subsampler unit 28 may, for example, comprise a sample averaging arrangement for averaging N samples followed by a line averaging arrangement for averaging N lines.

The subsampled fields of video information corresponding to the small or inset picture are written into a predetermined area of memory 30 controlled by microprocessor control unit 16. Since a subsampled field contains fewer samples and lines (determined by N) than a complete field, only a portion of memory 30 is occupied by the samples of the subsampled field and the rest of memory 30 may be considered as being empty.

Figure 3A:
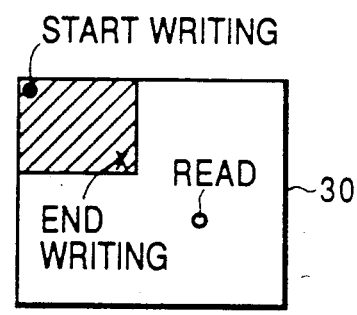
FIGS. 3a and 3b represent memory arrangements useful in understanding various operating modes of the processor shown in FIG. 1.

For example, with reference to FIG. 3a in the present embodiment, writing of the subsampled field begins at the "top-left" memory location (indicated by the dot), corresponding to line 1, sample 1 of the complete field and ends at some memory location (indicated by the X) dependent on N, thus "filling-in" only the top-left sector. The circle represents the memory location at which reading begins. By changing the address of the memory location at which reading begins, horizontal and vertical time delays are introduced before the inset field information is read out. These delays correspond to horizontal and vertical spatial shifts of the inset picture in the displayed image.

In the picture-in-picture mode, the write-in rate is slower than the read-out rate (related to the subsampling factor N), the size reduction for the inset picture being produced as a result of subsampling.

As earlier noted, in the picture-in-picture mode, third switching unit 22 is controlled by microprocessor control unit 16 to connect second input IN2 to output OUT, thereby by-passing interpolator unit 32 and directly coupling the output of memory 30 to DAC 34. Thus, interpolator unit 32 is not available for controlling the size of the inset picture in the present embodiment, that function being accomplished by controlling the subsampling factor N of subsampler 28.

The analog output signal of DAC 34 and the unconverted analog signal produced at first output OUT1 of first switching unit 14 are coupled to first input IN1 and second input IN2, respectively, of fourth switching unit 24. Fourth switching unit 24, under the control of microprocessor control unit 16, replaces the main video signal with the inset video signal (produced at the output of DAC 34) in the appropriate time interval corresponding to the desired location of the inset picture within the main picture. In this regard, the operation of fourth switching unit 24 is synchronized with the read operation of memory 30.

Other features concerning the positioning and sizing of the inset picture are described in copending patent application Ser. No. 341,123 entitled "INSET PICTURE CENTERING IN A PIX-IN-PIX SYSTEM" concurrently filed with the present application on Apr. 20, 1989 in the names of B. A. Canfield and D. J. Duffield.

MULTI-PICTURE MODE

The purpose of the multi-picture mode is to display a rectangular array of small picture insets. The small pictures may correspond to different fields of the same video signal or different fields of different video signals, such as may be provided at different channels.

Figure 3B:
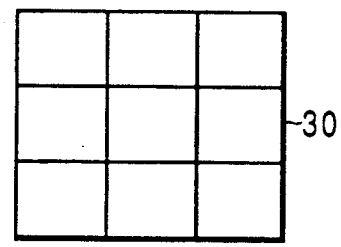

As in the picture-in-picture mode of operation, the subsamples provided by subsampler 28 are written-into and read-out of memory 30 at different rates, the write-in rate being slower than the read-out rate. However, unlike in the picture-in-picture mode of operation, the subsamples from successive fields are not written into the same area of memory, but rather, into different respective areas or sectors, such as shown in FIG. 3b.

under the control of microprocessor control unit 16. In addition to controlling the storage location of the different fields within memory 30, microprocessor control unit 16 also determines the rate at which subsampled fields are written into respective memory sectors. The number of small pictures in the rectangular array is related to the size of the pictures and therefore subsampling factor N.

Figure 2B:
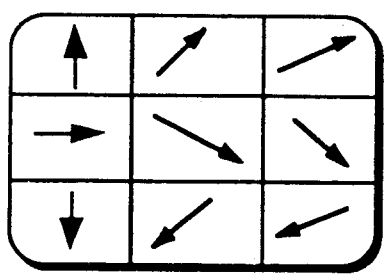

If the field sampling rate is relatively slow, the small pictures will appear as still images. In the case different fields of the same video signal are sampled at a slow rate, the small pictures will appear as stroboscopic "snap-shots" of an event taken at different times (see FIG. 2b) and as such, may be useful to study the various states of the event in detail.

When the fields are to be derived from different video sources such as different television channels, microprocessor control unit 16 has the additional function of coordinating the channel changes and is therefore coupled to the channel selection control input of the tuner of the appropriate video source, as is shown in FIG. 1.

The stored subsampled fields are repetitively read-out of the respective sectors of memory 30 coupled to DAC 34 through third switching unit 22. As in the case of the picture-in-picture mode, interpolator unit 32 is by-passed. In the multi-picture mode, unlike in the picture-in-picture mode, fourth switching unit 24 continuously couples the output of the DAC 34 to the output of the picture-in-picture processor.

INSTANT REPLAY MODE

The capability of the picture-in-picture processor to couple subsampler unit 28, memory 30 and interpolator unit 32 in cascade allows for a so-called "instant replay" mode of operation previously referred to as well as an artistic "mosaic" mode of operation not previously referred to.

The "instant replay" mode of operation has in common with the multi-picture operation the manner in which different fields are stored in respective sectors of memory 30 (see FIG. 3b). However, unlike in the multi-picture mode: (1) the read-out rate is the same as the write-in rate; and (2) interpolator unit 32 is not by-passed but is instead coupled between the output of memory 30 and the input of DAC 34 by means of third switching unit 22.

In addition, in the "instant replay" mode, the write operation is stopped after each sector has been loaded, and thereafter the sectors are sequentially and repetitively read out. The rate at which the sectors are addressed to be read out is user controllable to provide a range between slow motion reproduction and rapid motion reproduction. Further, the sequence can be changed, e.g., reversed under user control. The rate at which the samples and lines are read out of an addressed sector determines the expansion.

The result of this is that, as the subsampled fields are sequentially read out the respective sectors of memory 30 they are enlarged so that a sequence of enlarged, preferably near full screen size, "snap-shots" is repetitively displayed. This changes the previously essentially still multi-picture display and provides an animated, continuous loop stroboscopic study vehicle of the event previously stored.

The same type of operation can be provided when the fields stored in the sectors of memory 30 correspond to different channels.

MOSAIC MODE

The selectable configuration of subsampler unit 28, memory 30 and interpolator unit 32 also provides for a mosaic mode of operation whereby a full screen picture is produced in which image areas several pixels high and long have the one color. In this mode, the configuration is the same as in the zoom mode except that subsampler unit 28 is not by-passed but instead, coupled between the output of ADC 26 and input of memory 30. As a result, subsampled fields of the input video signal will be expanded, with each sample and line of the subsampled field repeated (by interpolator unit 32).

What is claimed is:

1. A method of operating a television system to provide an "instant-replay" feature, comprising the steps of:
    compressing successive fields of a television signal;
    storing successive ones of said compressed fields in respective sectors of a memory device;
    retrieving ones of said stored compressed fields from said memory sectors in a repetitive sequence; and
    expanding ones of said retrieved compressed fields in said repetitive sequence to produce a sequence of television fields.

2. The method recited in claim 1, further including the steps of:
    maintaining the contents of said memory device unchanged after all of said memory sectors contain respective ones of said compressed fields.

3. The method recited in claim 1, wherein:
    said compressing step includes subsampling pixels and lines of said fields; and
    said expanding step includes the step of interpolating said pixels and lines of said compressed fields stored in said memory sectors.

4. The method recited in claim 3, wherein:
    said interpolating step includes the step of repeating at least one of the lines and pixels of said compressed fields.

5. The method recited in claim 1, wherein:
    said compressed fields are stored in a field memory.

6. The method recited in claim 1, further including the step of:
    changing the order of retrieving said ones of said stored compressed fields.

7. The method recited in claim 1, further including the step of:
    changing the rate of sequencing through said repetitive sequence.

8. A method of operating a picture-in-picture television system to provide an "instant-replay" feature, comprising the steps of:
    subsampling successive fields of a television signal;
    storing successive ones of said subsampled fields in respective sectors of a memory device; and
    retrieving and expanding said ones of said subsampled fields stored in said memory sectors in a repetitive sequence to produce a sequence of television fields.

9. The method recited in claim 8, further including the steps of:
    maintaining the contents of said memory device unchanged after all of said memory sectors contain respective ones of said compressed fields.

10. The method recited in claim 8, wherein:
    said expanding step includes the step of interpolating lines and pixels of said compressed fields.

11. The method recited in claim 10, wherein:

said interpolating step includes the step of repeating at least one of the lines and pixels of said compressed fields.

12. The method recited in claim 8, wherein:
said compressed fields are stored in a field memory.

13. The method recited in claim 8, further including the step of:
changing the order of retrieving said ones of said stored subsampled fields.

14. The method recited in claim 8, further including the step of:
changing the rate of sequencing through said repetitive sequence.

15. A television system with an "instant-replay" feature, comprising:
means for compressing successive input fields of a television signal to produce successive compressed fields having fewer lines and pixels than respective ones of said input fields;
means for storing successive ones of said compressed fields in a predetermined number of respective memory sectors; and
means for retrieving and expanding said compressed fields stored in said respective memory sectors in a repetitive sequence to produce a sequence of television fields.

16. The system recited in claim 15, wherein:
said means for storing maintains the contents of all of said predetermined number of said respective memory sectors unchanged after all of said predetermined number of said respective memory sectors contain said successive ones of said compressed fields.

17. The system recited in claim 15, wherein:
said means for compressing includes means for deleting lines and pixels of said input fields; and
said means for expanding includes means for interpolating lines and pixels of said compressed fields.

18. The system recited in claim 15, wherein:
said means for storing has a capacity corresponding to one of said input fields.

19. The system recited in claim 15, wherein:
said means for retrieving and expanding includes means for changing the order of retrieving said stored compressed fields.

20. The system recited in claim 15, wherein:
said means for retrieving and expanding includes means for changing the rate of sequencing through said repetitive sequence.

21. In a picture-in-picture television system including a memory for storing compressed versions of respective input fields of a television signal in respective memory sectors, the compressed fields stored in said respective memory sectors corresponding to respective picture sectors of a multiple picture display produced during a "multiple-picture" mode of operation, apparatus comprising:
means for reading and expanding the contents of said respective memory sectors in a repetitive sequence to produce a sequence of expanded television fields corresponding to respective pictures larger in size than said respective picture sectors during an "instant replay" mode of operation.

22. The method recited in claim 21, wherein:
said means for reading and expanding includes means for changing the order of reading said contents of said respective memory sectors.

23. The method recited in claim 21, wherein:
said means for reading and expanding includes means for changing the rate of sequencing through said repetitive sequence.

24. A television system with an "instant-replay" feature, comprising:
means for compressing successive fields of a television signal;
means for storing successive ones of said compressed fields in respective sectors of a memory device;
means for retrieving and expanding ones of said stored compressed fields in a repetitive sequence to produce a sequence of television fields; and
control means coupled to said means for retrieving and expanding for changing the rate of sequencing through said repetitive sequence.

25. A television system with an "instant-replay" feature, comprising:
means for compressing successive fields of a television signal;
means for storing successive ones of said compressed fields in respective sectors of a memory device;
means for retrieving ones of said stored compressed fields from said respective sectors of said memory device in a repetitive sequence;
control means coupled to said means for retrieving for changing the order in which said ones of said stored compressed fields are retrieved in said repetitive sequence; and
means for expanding said retrieved ones of said stored compressed fields in said repetitive sequence to produce a sequence of television fields.

* * * * *